(12) United States Patent
Wilson et al.

(10) Patent No.: US 11,498,998 B2
(45) Date of Patent: Nov. 15, 2022

(54) PRODUCTION OF KETONE-BASED BIOPOLYMERS FROM CATALYTIC FAST PYROLYSIS OF BIOMASS

(71) Applicant: Alliance for Sustainable Energy, LLC, Golden, CO (US)

(72) Inventors: Andrew Nolan Wilson, Denver, CO (US); Michael Brandon Griffin, Denver, CO (US); Mark R. Nimlos, Golden, CO (US); Joshua A. Schaidle, Arvada, CO (US)

(73) Assignee: Alliance for Sustainable Energy, LLC, Golden, CO (US)

( * ) Notice: Subject to any disclaimer, the term of this patent is extended or adjusted under 35 U.S.C. 154(b) by 331 days.

(21) Appl. No.: 16/819,745

(22) Filed: Mar. 16, 2020

(65) Prior Publication Data
US 2020/0291163 A1    Sep. 17, 2020

Related U.S. Application Data

(60) Provisional application No. 62/818,442, filed on Mar. 14, 2019.

(51) Int. Cl.
*C08G 8/02* (2006.01)
*C08G 61/08* (2006.01)
(Continued)

(52) U.S. Cl.
CPC ............... *C08G 8/02* (2013.01); *B01D 3/143* (2013.01); *C08G 16/00* (2013.01); *C08G 61/08* (2013.01);
(Continued)

(58) Field of Classification Search
CPC .......... C08G 8/02; C08G 16/00; C08G 61/08; C08G 2261/1422; C08G 2261/1428;
(Continued)

(56) References Cited

U.S. PATENT DOCUMENTS 4,898,928 A * 2/1990 Heller ..................... C08G 4/00
568/591

FOREIGN PATENT DOCUMENTS

JP         63097947    * 10/1986   ............... G03C 1/72
WO   WO 2011140644    *  5/2010   .......... A61K 31/7088

OTHER PUBLICATIONS

Shenoi et al. (Biomacromolecules 2016, 17, 3683-3693).*
(Continued)

*Primary Examiner* — Shane Fang
(74) *Attorney, Agent, or Firm* — Michael A. McIntyre

(57) ABSTRACT

The present disclosure relates to a composition that includes

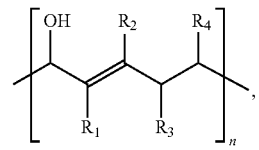

where $R_1$ and $R_2$ include at least one of a hydrogen, a hydroxyl group, and/or an alkyl group, $R_3$ and $R_4$ include at least one of hydrogen, a hydroxyl group, an alkyl group, and/or a ketone, and $1 \leq n \leq 2000$.

8 Claims, 7 Drawing Sheets

(51) Int. Cl.
*C08G 16/00* (2006.01)
*B01D 3/14* (2006.01)

(52) U.S. Cl.
CPC ............... *C08G 2261/1422* (2013.01); *C08G 2261/1428* (2013.01); *C08G 2261/1642* (2013.01); *C08G 2261/3327* (2013.01); *C08G 2261/40* (2013.01)

(58) Field of Classification Search
CPC .... C08G 2261/1642; C08G 2261/3327; C08G 2261/40; B01D 3/143
See application file for complete search history.

(56) References Cited

OTHER PUBLICATIONS

Banek et al., "Sustainable Conversion of Lignocellulose to High-Purity, Highly Crystalline Flake Potato Graphite", 2018, ACS Sustainable Chemistry & Engineering, vol. 6, No. 10, pp. 13199-13207.

Dutta et al., "Process Design and Economics for the Conversion of Lignocellulosic Biomass to Hydrocarbon Fuels Thermochemical Research Pathways with In Situ and Ex Situ Upgrading of Fast Pyrolysis Vapors", NREL Technical Report NREL/TP-5100-62455, CFP Design Report, Mar. 2015, pp. 1-275.

Griffin et al., "Role of the Support and Reaction Conditions on the Vapor-Phase Deoxygenation of m-Cresol over Pt/C and Pt/TiO2 Catalysts", ACS Catalysis, 2016, vol. 6, No. 4, pp. 2715-2727.

Griffin et al., "Driving towards cost-competitive biofuels through catalytic fast pyrolysis by rethinking catalyst selection and reactor configuration", Energy & Environmental Science, 2018, vol. 11, pp. 2904-2918.

Iisa et al., "Production of low-oxygen bio-oil via ex situ catalytic fast pyrolysis and hydrotreating", Fuel, Nov. 2017, vol. 207, pp. 413-422.

Neary et al., "Variable Temperature ROMP: Leveraging Low Ring Strain Thermodynamics to Achieve Well-Defined Polypentenamers", Macromolecule, Jun. 2017, vol. 50, No. 13, pp. 4935-4951.

Ruddy et al., "Recent advances in heterogeneous catalysts for bio-oil upgrading via "ex situ catalytic fast pyrolysis": catalyst development through the study of model compounds", Green Chemistry, Feb. 2014, vol. 16, No. 2, pp. 454-490.

Schaidle et al., "Experimental and Computational Investigation of Acetic Acid Deoxygenation over Oxophilic Molybdenum Carbide: Surface Chemistry and Active Site Identity", ACS Catalysis, Jan. 2016, vol. 6, No. 2, pp. 1181-1197.

Schaidle et al., "Catalytic Upgrading of Pyrolysis Products" Chemical Catalysis for Bioenergy, DOE Bioenergy Technologies Office (BETO) 2019 Project Peer Review, Mar. 2019, pp. 1-57.

Tuba et al., "One-pot synthesis of poly(vinyl alcohol) (PVA) copolymers via ruthenium catalyzed equilibrium ring-opening metathesis polymerization of hydroxyl functionalized cyclopentene", Macromolecules, 2014, vol. 47, pp. 8190-8195.

Venderbosch, "A Critical View on Catalytic Pyrolysis of Biomass", ChemSusChem, vol. 8, No. 8, Apr. 2015, pp. 1306-1316.

Wang et al., "Reactive catalytic fast pyrolysis of biomass to produce high-quality bio-crude", Green Chemistry, 2017, vol. 19, No. 14, pp. 3243-3251.

Whiting, "New Approaches for the Synthesis of biodegradable polymers", Cornell University, Dissertation, Jan. 2012, pp. 1-141.

Wilson et al., "Five-Membered Cyclic Ketones—Materials from a Bio-sourced Monomer Class", Poster, Gordon Research Conference—Polymers, Jun. 2019, p. 1.

\* cited by examiner

PRODUCTION OF KETONE-BASED BIOPOLYMERS FROM CATALYTIC FAST PYROLYSIS OF BIOMASS

CROSS-REFERENCE TO RELATED APPLICATIONS

This application claims priority from U.S. Provisional Patent Application No. 62/818,442 filed Mar. 14, 2019, the contents of which are incorporated herein by reference in their entirety.

CONTRACTUAL ORIGIN

This invention was made with government support under Contract No. DE-AC36-08GO28308 awarded by the Department of Energy. The government has certain rights in the invention.

BACKGROUND

Five membered cyclic ketones provide a monomer class being explored for material applications as these ketones can be produced from biomass conversion processes and can contribute to the creation of a circular carbon economy. Materials derived from the cyclic ketones may also exhibit performance advantages over existing materials, which may create market pull for commercial development. Multiple chemical handles are available for polymerization, such as the ketone group in cyclopentanone, which can be incorporated into polyketals (polymer with ketal linkages in the backbone), or the double bond in 2-cyclopenten-1-one, which serves as a metathesis site in ring opening metathesis polymerization (ROMP). Thus, there remains a need for obtaining cyclic ketones from bioderived sources, and methods for reacting the separated ketones to produce novel materials.

SUMMARY

An aspect of the present disclosure is a composition that includes

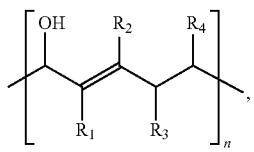

where $R_1$ and $R_2$ include at least one of a hydrogen, a hydroxyl group, and/or an alkyl group, $R_3$ and $R_4$ include at least one of hydrogen, a hydroxyl group, an alkyl group, and/or a ketone, and $1 \leq n \leq 2000$.

In some embodiments of the present disclosure, the composition may be derived from at least one of

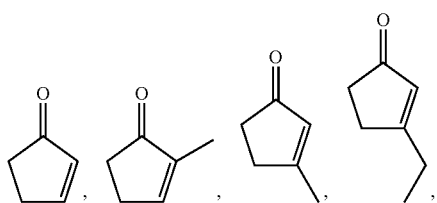

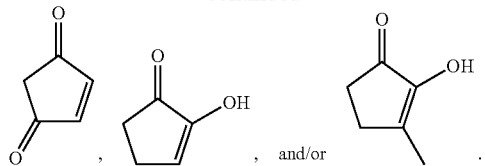

, and/or

In some embodiments of the present disclosure, the composition may include at least one of

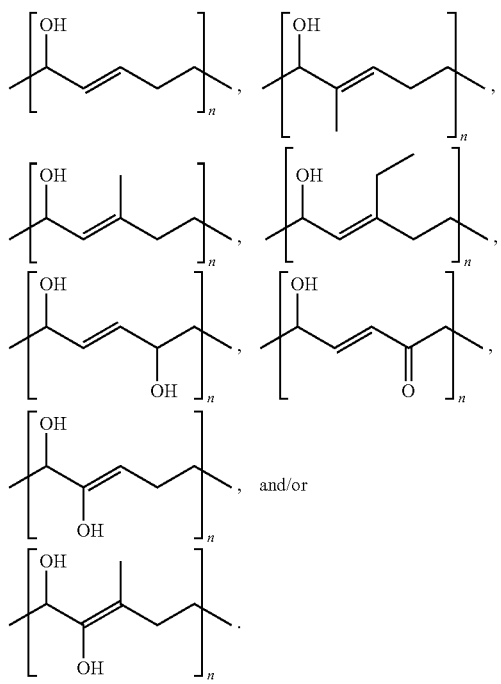

, and/or

.

In some embodiments of the present disclosure, the alkyl group may include at least one of a methyl group, an ethyl group, a propyl group, and/or a butyl group. In some embodiments of the present disclosure, the composition may further include an end-group derived from a mono vinyl compound. In some embodiments of the present disclosure, the composition may be bioderived. In some embodiments of the present disclosure, at least a portion of the carbon-carbon double bond may be reacted such that the composition further includes a functional group $R_5$. In some embodiments of the present disclosure, $R_5$ may include at least one of sulfur, nitrogen, oxygen, and/or a halogen An aspect of the present disclosure is a composition that includes

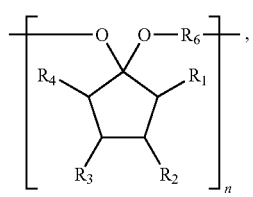

where $R_1$, $R_2$, $R_3$, and $R_4$ each include at least one of a hydrogen, a hydroxyl group, and/or an alkyl group, $R_6$ includes at least one of a hydrocarbon chain and/or a hydrocarbon ring having between 1 and 20 carbon atoms, and $1 \leq n \leq 2000$.

In some embodiments of the present disclosure, the composition may be derived from at least one of

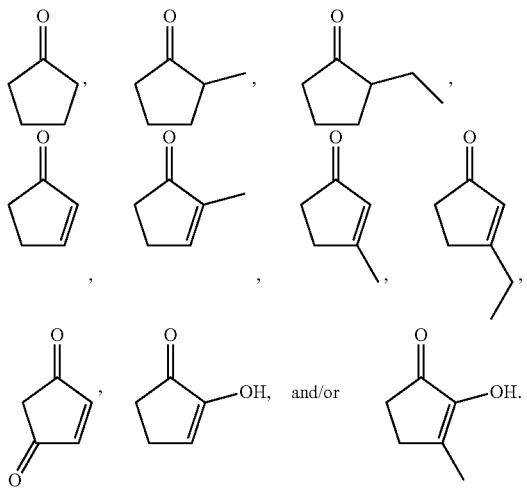

In some embodiments of the present disclosure, the composition may be further derived from at least one of

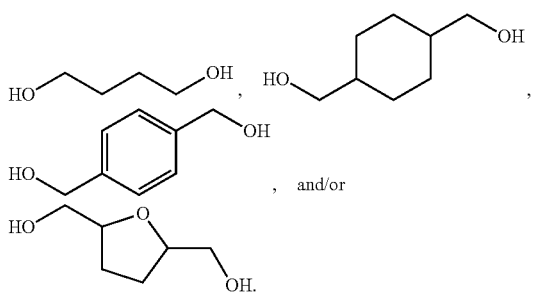
, and/or

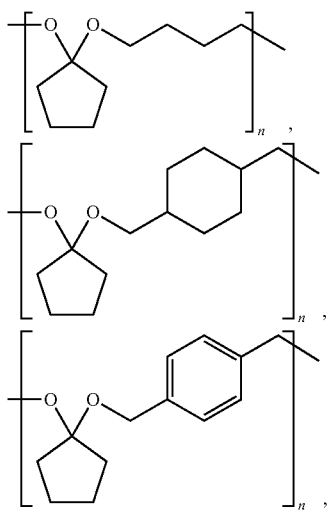

In some embodiments of the present disclosure, the composition may include at least one of

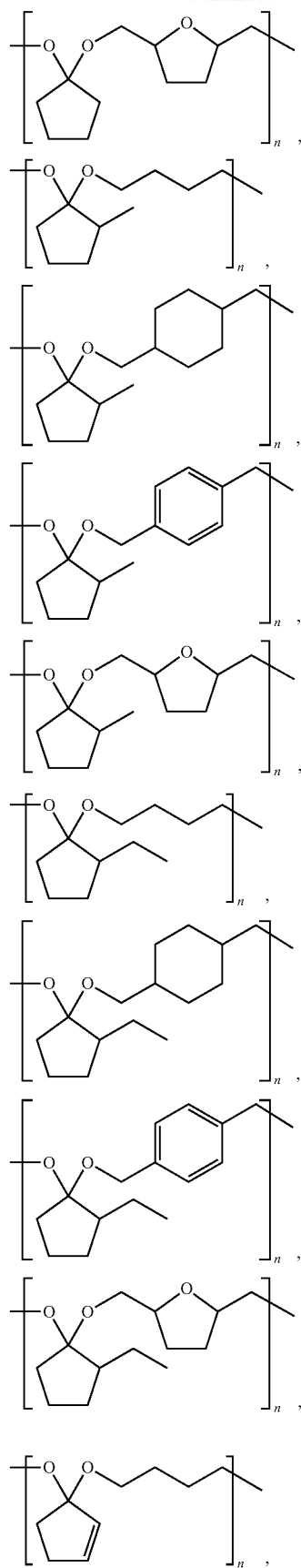

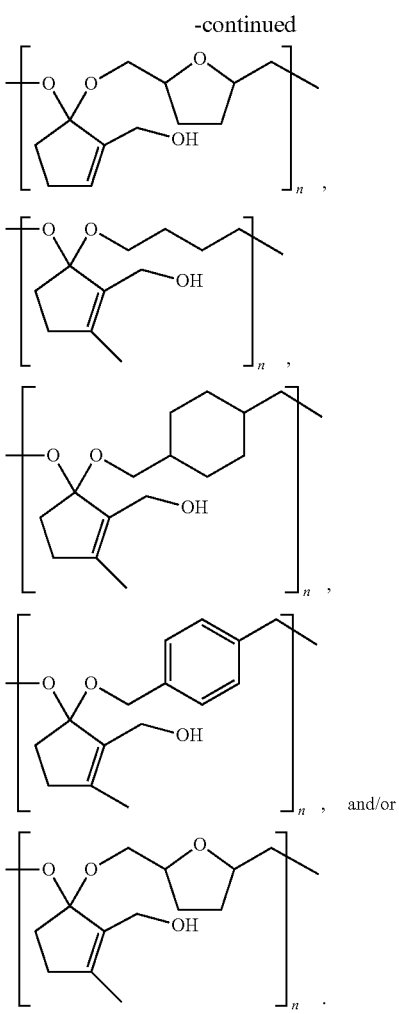

and/or

In some embodiments of the present disclosure, the composition may further include an end-group derived from an alcohol. In some embodiments of the present disclosure, the composition may be bioderived.

An aspect of the present disclosure is a method that includes a first reacting of a first molecule defined by

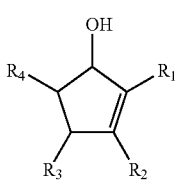

to form a polymer defined by

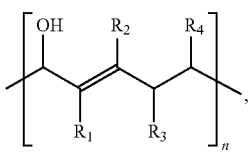

where $R_1$ and $R_2$ include at least one of a hydrogen, a hydroxyl group, and/or an alkyl group, $R_3$ and $R_4$ include at least one of hydrogen, a hydroxyl group, an alkyl group, and/or a ketone, and $1 \leq n \leq 2000$.

In some embodiments of the present disclosure, the method may further include a second reacting of a second molecule defined by

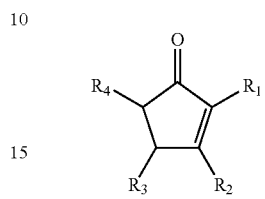

to form the first molecule, where the second reacting is performed prior to the first reacting. In some embodiments of the present disclosure, the method may further include prior to the second reacting, separating the second molecule from a mixture that may include compounds derived from catalytic fast pyrolysis. In some embodiments of the present disclosure, the separating may include at least one of distillation and/or liquid-liquid separation.

An aspect of the present disclosure is a method that includes a first reacting of a first molecule defined by

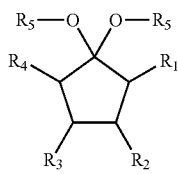

with a second molecule defined by

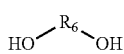

to form a polymer defined by

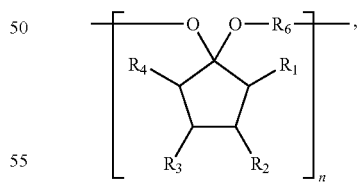

where each of $R_1$, $R_2$, $R_3$, and $R_4$ include at least one of a hydrogen, a hydroxyl group, and/or an alkyl group, $R_5$ includes a hydrocarbon chain having between 1 and 5 carbon atoms, $R_6$ includes at least one of a hydrocarbon chain and/or a hydrocarbon ring having between 1 and 20 carbon atoms, and $1 \leq n \leq 2000$.

In some embodiments of the present disclosure, the method may further include a second reacting of a second molecule defined by

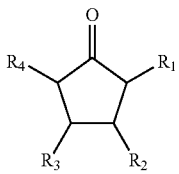

with an alcohol to form the first molecule, where the second reacting is performed prior to the first reacting. In some embodiments of the present disclosure, the first reacting may produce the alcohol. In some embodiments of the present disclosure, the method may further include, prior to the second reacting, separating the second molecule from a mixture including compounds derived from catalytic fast pyrolysis. In some embodiments of the present disclosure, the separating may include at least one of distillation and/or liquid-liquid separation.

BRIEF DESCRIPTION OF THE DRAWINGS

Some embodiments are illustrated in referenced figures of the drawings. It is intended that the embodiments and figures disclosed herein are to be considered illustrative rather than limiting.

DETAILED DESCRIPTION

Figure 1:
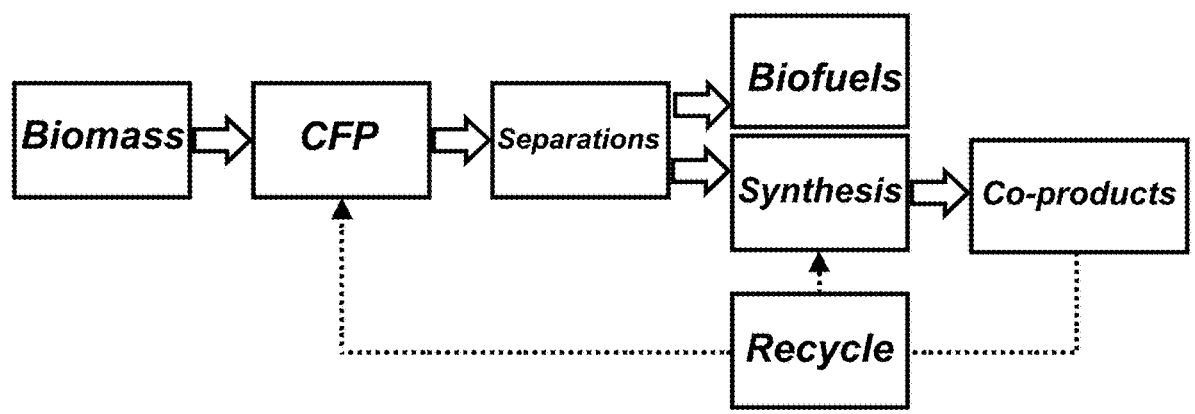
FIG. 1 illustrates a flow diagram of a system for converting biomass to fuels and recyclable polymer products, according to some embodiments of the present disclosure.

The present disclosure may address one or more of the problems and deficiencies of the prior art discussed above. However, it is contemplated that some embodiments as disclosed herein may prove useful in addressing other problems and deficiencies in a number of technical areas. Therefore, the embodiments described herein should not necessarily be construed as limited to addressing any of the particular problems or deficiencies discussed herein.

References in the specification to "one embodiment", "an embodiment", "an example embodiment", "some embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

As used herein the term "substantially" is used to indicate that exact values are not necessarily attainable. By way of example, one of ordinary skill in the art will understand that in some chemical reactions 100% conversion of a reactant is possible, yet unlikely. Most of a reactant may be converted to a product and conversion of the reactant may asymptotically approach 100% conversion. So, although from a practical perspective 100% of the reactant is converted, from a technical perspective, a small and sometimes difficult to define amount remains. For this example of a chemical reactant, that amount may be relatively easily defined by the detection limits of the instrument used to test for it. However, in many cases, this amount may not be easily defined, hence the use of the term "substantially". In some embodiments of the present invention, the term "substantially" is defined as approaching a specific numeric value or target to within 20%, 15%, 10%, 5%, or within 1% of the value or target. In further embodiments of the present invention, the term "substantially" is defined as approaching a specific numeric value or target to within 1%, 0.9%, 0.8%, 0.7%, 0.6%, 0.5%, 0.4%, 0.3%, 0.2%, or 0.1% of the value or target.

As used herein, the term "about" is used to indicate that exact values are not necessarily attainable. Therefore, the term "about" is used to indicate this uncertainty limit. In some embodiments of the present invention, the term "about" is used to indicate an uncertainty limit of less than or equal to ±20%, ±15%, ±10%, ±5%, or ±1% of a specific numeric value or target. In some embodiments of the present invention, the term "about" is used to indicate an uncertainty limit of less than or equal to ±1%, ±0.9%, ±0.8%, ±0.7%, ±0.6%, ±0.5%, ±0.4%, ±0.3%, ±0.2%, or ±0.1% of a specific numeric value or target.

The present disclosure relates to methods for separating cyclic ketones from biomass, which enables the synthesis of novel materials including monomers and polymers. FIG. 1 illustrates that, according to some embodiments of the present disclosure, concomitant production of cyclic ketone-based materials with biofuels can be realized by separating the ketones from the biofuels stream. To enable the valorization of cyclic ketones from biomass conversion, separation methods/systems to purify the compounds are needed, synthesis methods for various materials should be explored, and the polymer properties characterized. At least some of the embodiments described herein address these needs.

Figure 2A:
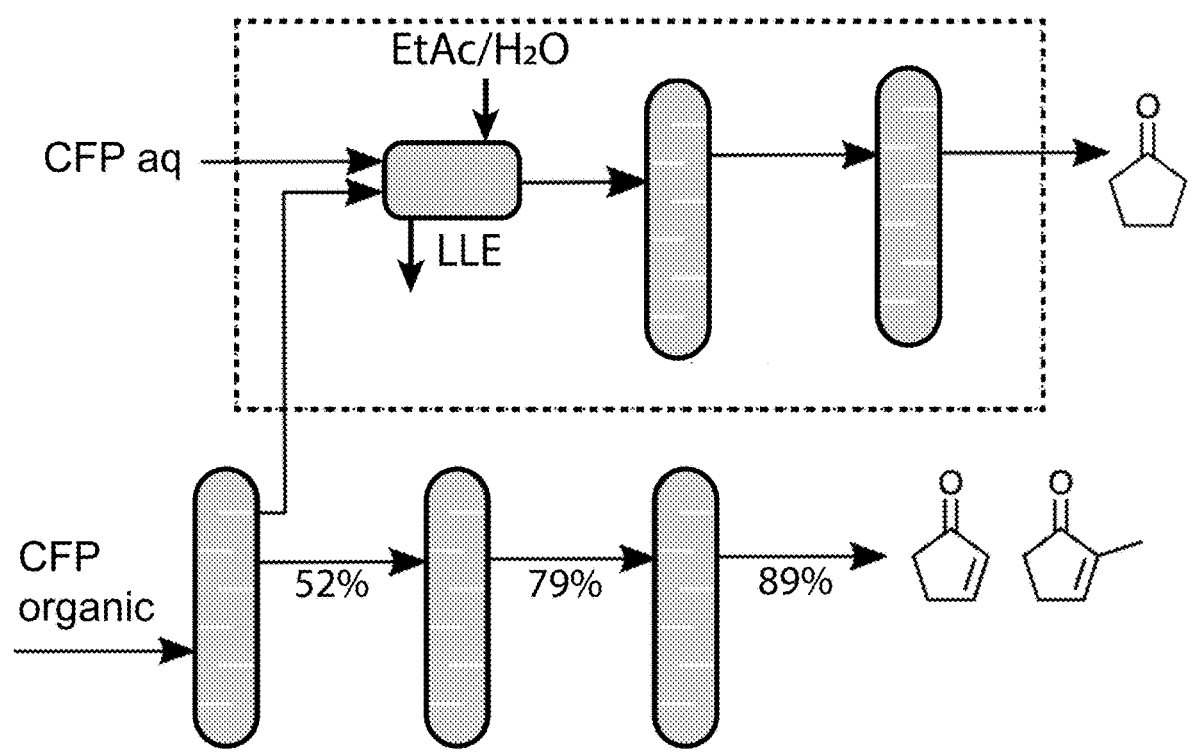
FIG. 2A illustrates a system for separating various cyclic ketones for subsequent conversion to polymers, according to some embodiments of the present disclosure.

As described herein, thermochemical conversion of biomass, e.g. catalytic fast pyrolysis (CFP), may provide raw material streams that contain cyclic ketones. When separated, the cyclic ketones may be reacted (e.g. polymerized) to produce useful products. FIG. 2A illustrates a system for separating various cyclic ketones for subsequent conversion to polymers, according to some embodiments of the present disclosure. Specifically, FIG. 2A illustrates a separation method where 2-cyclopenten-1-ones and cyclopentanone are separated from CFP-generated materials. Among other things, the 2-cyclopenten-1-ones may act as metathesis sites for ring opening metathesis polymerization (ROMP). The system shown in FIG. 2A also enables the separation of cyclopentanone from both aqueous and organic (e.g. hydrocarbon) streams typically produced in biorefineries. The percentages shown correspond to the weight percent of cyclopentenones resulting from each separation step. Starting at the top left, a CFP-derived aqueous stream (CFP aq)

may be feed to a liquid-liquid separator (LLE) to which is also fed an ethyl acetate/water mixture (EtAc/H$_2$O). The light phase containing cyclic ketones may then be directed to a series of two distillation columns to yield high purity cyclic ketones capable of being polymerized. Further, the system shown in FIG. 2A may also treat a CFP-derived organic stream (CFP organic), where the stream is directed to three distillation columns in series, resulting in the production cyclic ketones capable of being polymerized. Examples of cyclic ketones are shown.

Figure 2B:
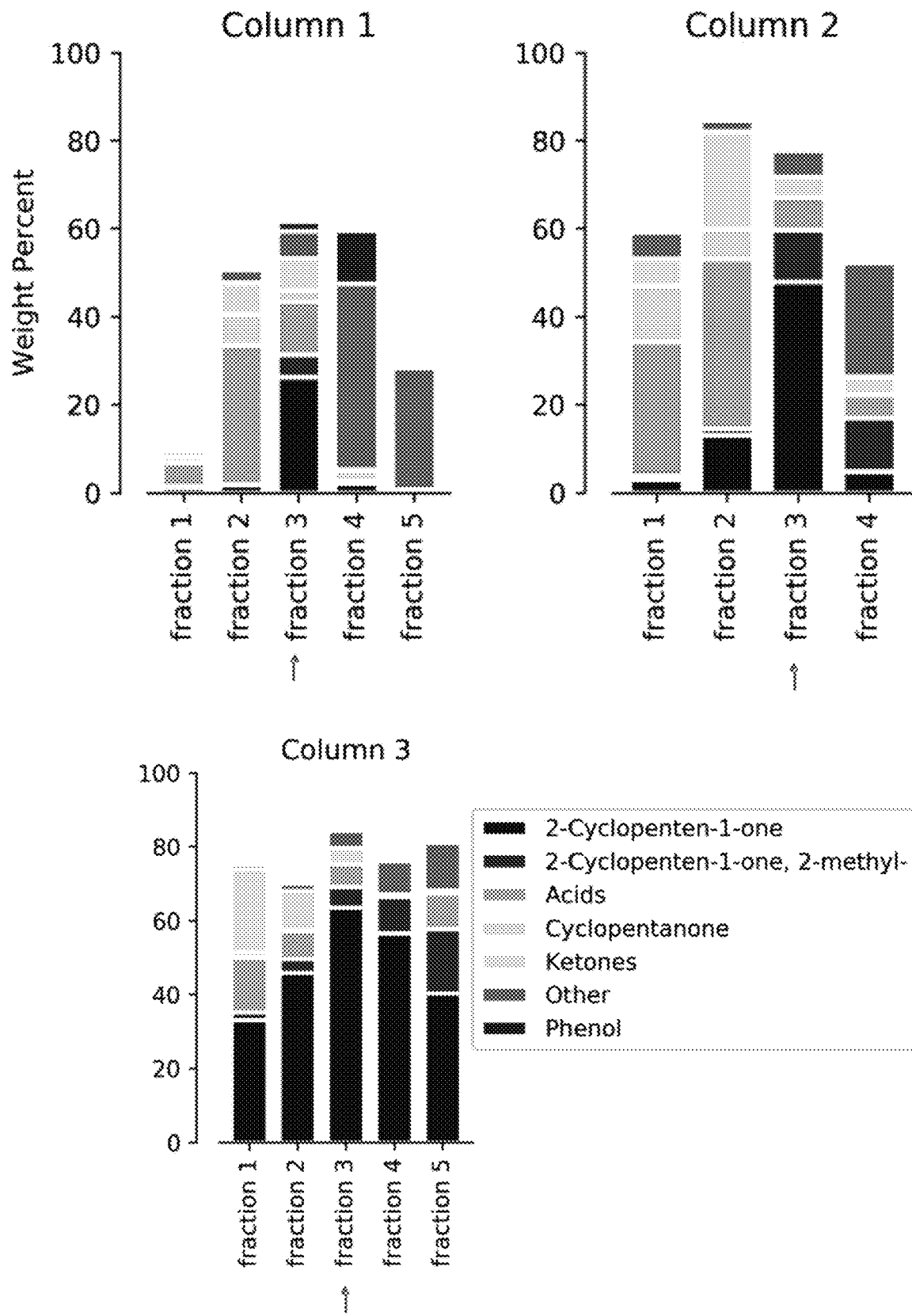
FIG. 2B illustrates experimental results obtained using a system like that shown in FIG. 2A, according to some embodiments of the present disclosure.

FIG. 2B illustrates experimental results obtained by completing three batch distillation separations in series, to simulate a system like that shown in FIG. 2A for obtaining cyclic ketols from an organic stream derived from CFP. In this experimental example, the purities of cyclic ketols were approximately 31%, 61%, and 69% after each successive distillation column, respectively. Referring to FIG. 2B, the compounds listed in the legend are stacked in the reverse order in each of the bars, from top to bottom. The data shows fraction 3, the target product fraction, resulting from each consecutive distillation improves the purity of the monomer. As. The data was produced on a batch distillation column and would have different product compositions under steady state operation, but the overall goal of increasing monomer purity would be achieved.

Separation of the cyclic ketones may occur from the aqueous and/or organic streams produced from CFP, using at least some of the unit operations and methods described below. For the separation of cyclic ketones from the organic phase a series of distillation columns may be used and/or combined with other separation unit operations such as liquid-liquid extraction, membrane technology, adsorption, and/or simulated moving beds. Distillation may occur between full vacuum and 10 bar, with temperatures between −50° C. and 400° C. Enriched product, cyclic ketones, may be obtained from the top or bottom of the columns and the remaining process streams may be recycled and/or utilized for other products in a CPF biorefinery. Entrainers and/or pressure swing distillation may be used to improve separation of cyclic ketones from the remainder of the CFP-generated material. Entrainers, are compounds added to a mixture to alter system thermodynamics such as breaking or creating azeotropes or, for pressure swing distillation, may improve separation. In liquid-liquid extraction, water and an organic solvent form a two-phase system, which may be used to extract enriched cyclic ketones. For adsorption and/or simulating-moving bed, resins which preferentially bind cyclic ketones and/or impurities in the process stream may be used to enrich the cyclic ketones. From the aqueous phase, a dewatering unit operation may be used to remove bulk water. Liquid-liquid extraction, distillation, membranes, adsorption, or simulated moving beds may be used for this unit operation. After dewatering, the enriched cyclic-ketone-containing stream may be separated using the same processes as for the organic stream. In some embodiments of the present disclosure, cyclopentenone was isolated for ROMP polymerization, using three consecutive distillation towers. The product stream contained a 90 wt % of a mixture of 2-cyclepenten-1-one and methy-2-cyclepenten-1-one.

Metathesis reactions used in ROMP are entropically driven reactions where the conformational entropic state of the polymer is higher than that of the translational entropic state of the monomers. ROMP offers access to controlled polymer architecture and can offer new opportunities for material design through post polymerization modification of the double bond. Scheme 1A illustrates a generalized ROMP reaction for reacting cyclic ketones obtained from CFP to produce cyclic alcohols, which may be subsequently polymerized, according to some embodiments of the present disclosure.

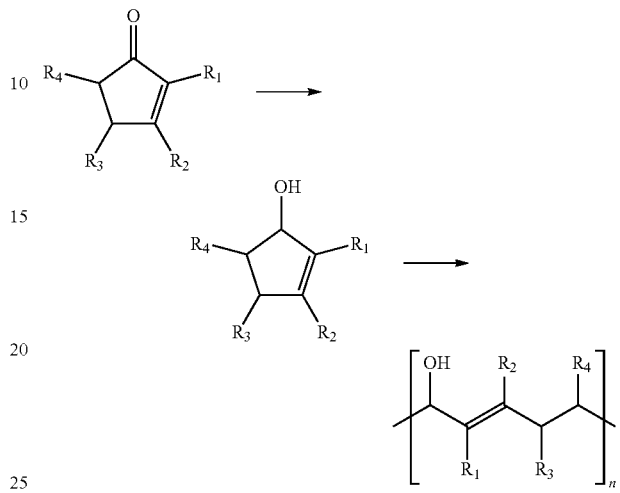

Scheme 1A

Referring to Scheme 1A, $R_1$ and $R_2$ are functional groups that may include at least one of a hydrogen, a hydroxyl group, and/or an alkyl group. $R_3$ and $R_4$ are functional groups that may include at least one of hydrogen, a hydroxyl group, an alkyl group, and/or a ketone. An alkyl group may include at least one of a saturated straight hydrocarbon chain and/or a saturated branched hydrocarbon chain. Non-limiting examples of an alkyl group include a methyl group, an ethyl group, a propyl group, and a butyl group. Referring again to Scheme 1A, where an alkyl group is defined by $(CH_2)_nCH_3$, n may be between zero and 10, inclusively. In some embodiments of the present disclosure, at least one of $R_1$, $R_2$, $R_3$ and/or $R_4$ may include any element needed for a particular end-product and/or end-use. Examples include nitrogen, sulfur, phosphorus, and/or a halogen. Examples of end-products, which may be at least partially synthesized as described in any one of the reactions described herein, include pesticides, pharmaceuticals, and flame retardants. A polymer produced according to Scheme 1A may have between 1 and 1000 repeat units (i.e. 2≤n≤2000). End groups will be determined by reaction termination species which is performed with mono vinyl compound, such as ethyl vinyl ether.

Post-polymerization functionalization may occur to alter the result material properties or application. Functionalization can occur across the double bond to add additional pendent groups or fully cross-link the material, as shown in Scheme 1B below.

Scheme 1B

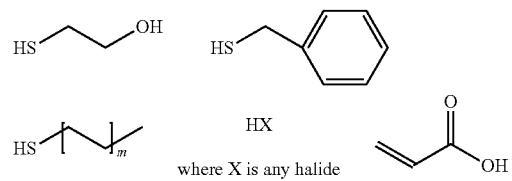

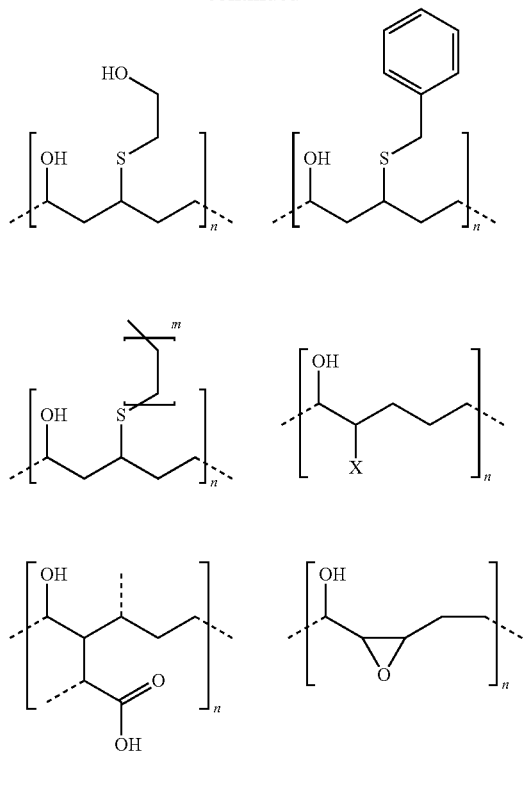

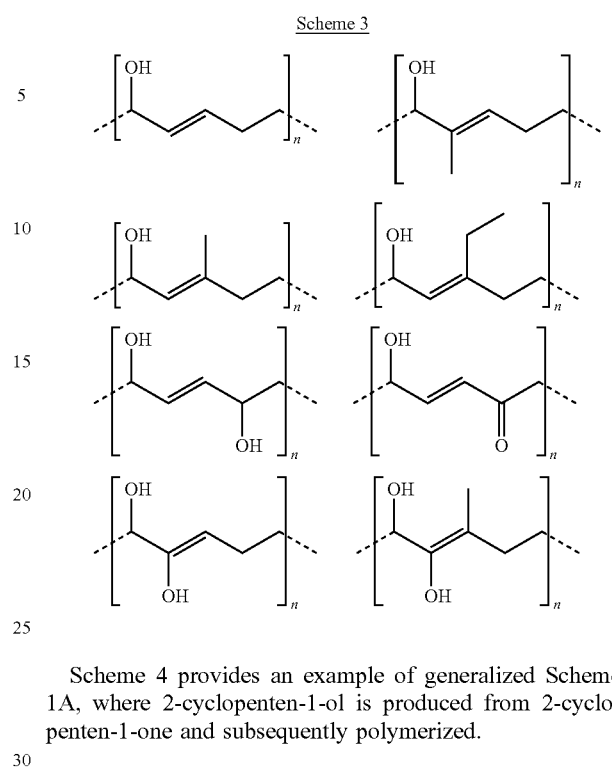

Scheme 4 provides an example of generalized Scheme 1A, where 2-cyclopenten-1-ol is produced from 2-cyclopenten-1-one and subsequently polymerized.

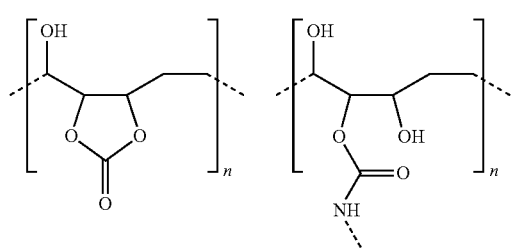

Examples of CFP-derived starting monomers suitable for creating polymers like that shown in Scheme 1A, that fall within the scope of the present disclosure, are summarize in Scheme 2 below, with the resultant polymer structures summarized in Scheme 3 below.

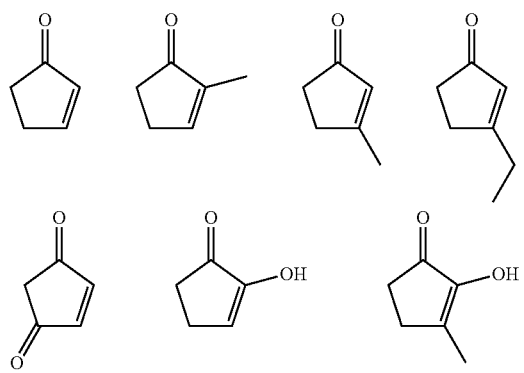

Figure 3:
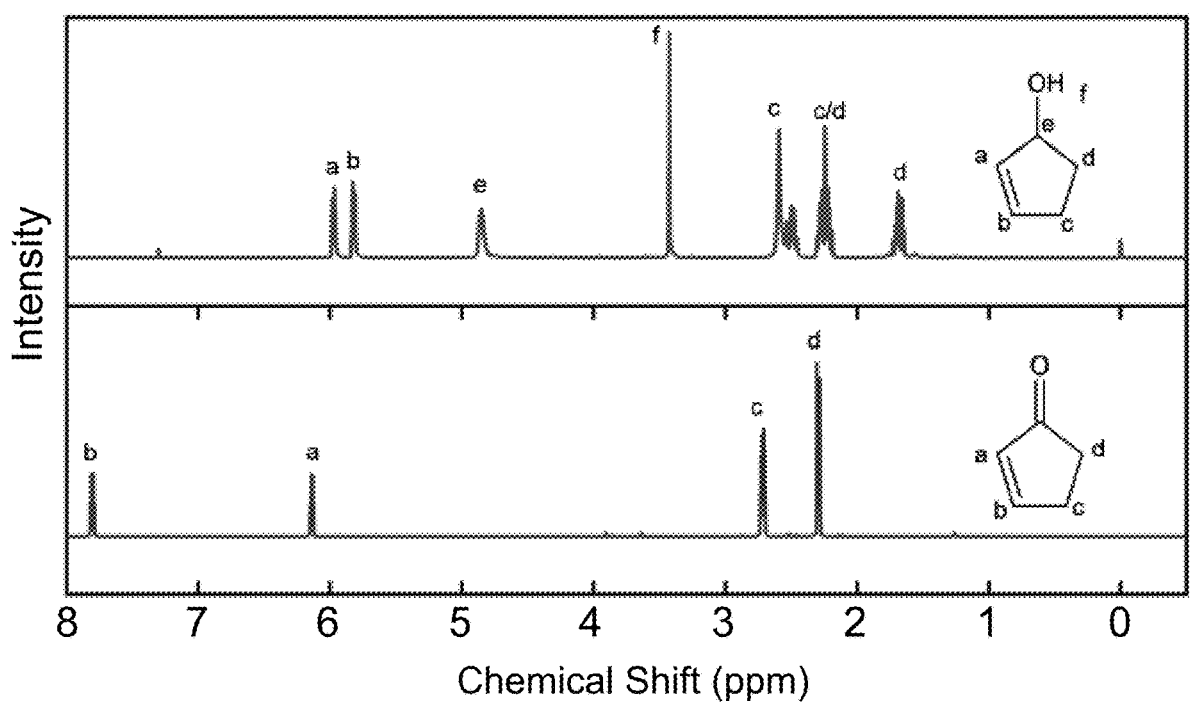
FIG. 3 illustrates NMR data for reducing a cyclic ketone to form a cyclic alcohol, according to some embodiments of the present disclosure.
Figure 4:
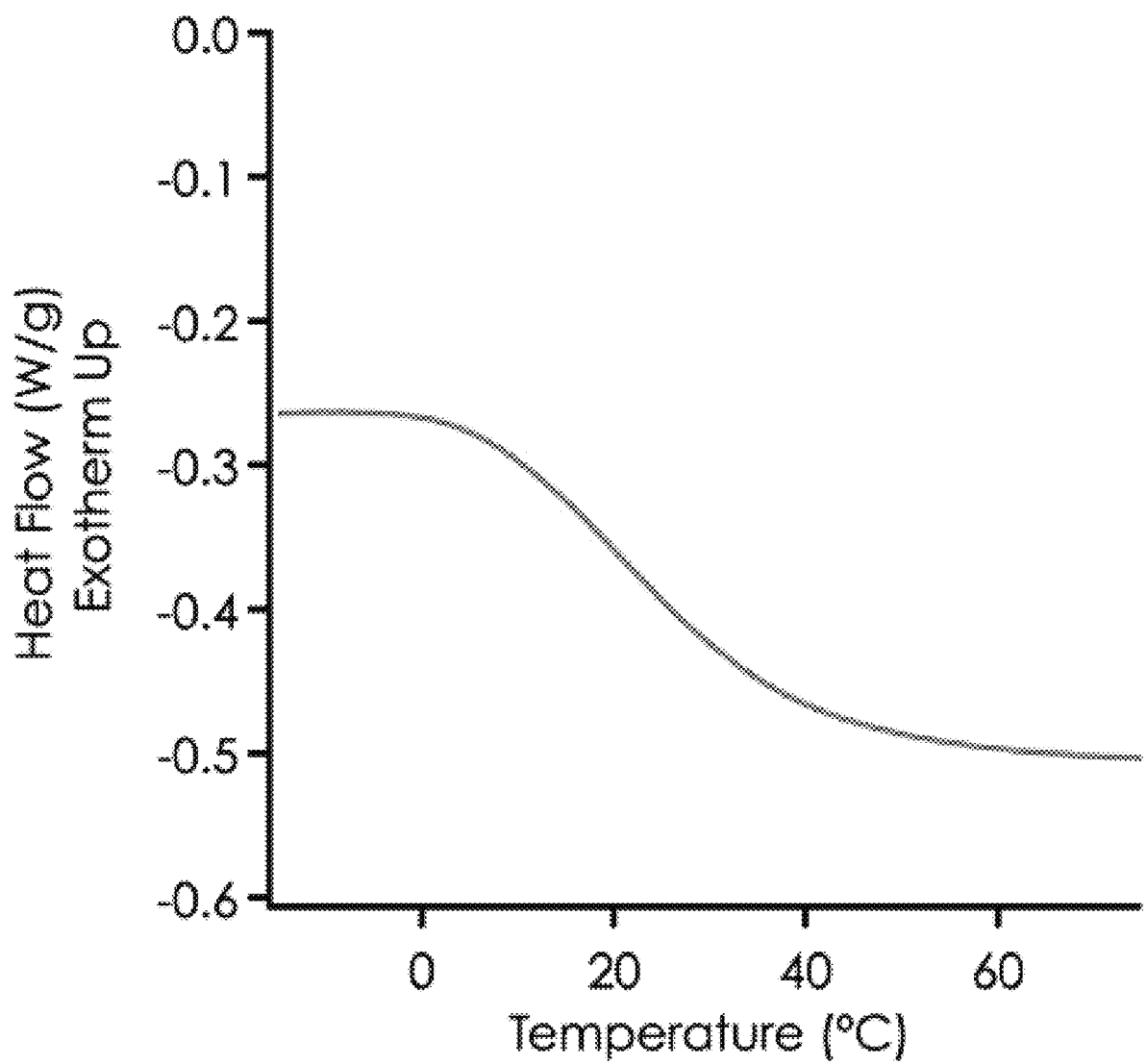
FIG. 4 illustrates the differential scanning calorimetry (DSC) trace of a bioderived polyketal, according to some embodiments of the present disclosure.

Referring to Scheme 4, according to some embodiments of the present disclosure, 2-cyclopenten-1-ol was synthesized by a Luche reduction of the ketone using cerium (III) chloride to prevent reduction of the double bond and sodium borohydride as the reducing agent (see FIG. 3 for NMR data). For ring opening metathesis polymerization (ROMP), one gram of 2-cyclopenten-1-ol was added to a 5.636 mM solution of Hoveyda-Grubbs Catalyst™ in anhydrous THF. The solution was stirred at room temperature for 15 minutes and then cooled to 0° C. and stirred for an additional 120 minutes. The reaction was terminated by contacting the solution with 0.5 mL of ethyl vinyl ether for 15 minutes. The polymer was purified using basic alumina and precipitated in cold hexane. After collection, the product was re-dissolved in methanol and then precipitated in cold hexane. The dried product was produced at 61% yield. The ROMP method (see Scheme 1A) described herein was also applied to a mixture of bioderived 2-cyclopenten-1-one and methyl-2-cyclopenten-1-ones. The glass transition temperature of the resultant material was approximately 9° C. (see FIG. 4).

A further aspect of the present disclosure is the synthesis of polyketals via condensation chemistry of a ketone and a diol, as shown in Scheme 5 below.

Scheme 5

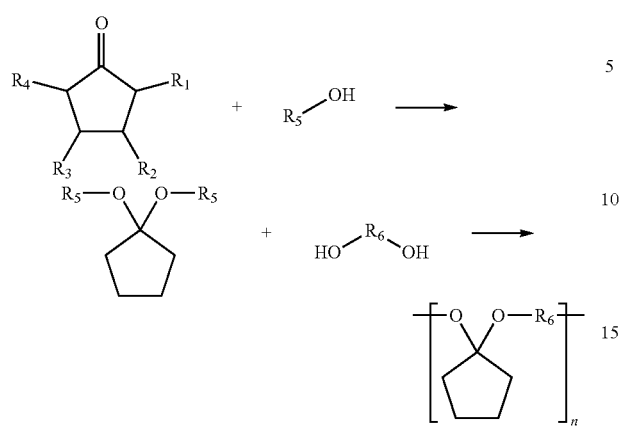

Scheme 5 starts with a first step, the reacting of a cyclic ketone with an alcohol to form a diether. The diether may then be reacted in a second step with a diol to form a polyketal. These reactions are shown to occur in series; however, this is for illustrative purposes. In some embodiments of the present disclosure, the first step and the second step may occur in parallel, at substantially the same time, in the same reactor. $R_1$, $R_2$, $R_3$, and $R_4$ are functional groups that may include at least one of a hydrogen, a hydroxyl group, and/or an alkyl group. An alkyl group may include at least one of a saturated straight hydrocarbon chain and/or a saturated branched hydrocarbon chain. Examples of an alkyl group include a methyl group, an ethyl group, a propyl group, and a butyl group. Referring again to Scheme 5, where an alkyl group is defined by $(CH_2)_n CH_3$, n may be between zero and 10, inclusively. The alcohol includes $R_5$ is a functional group, which may include a saturated hydrocarbon chain and/or an unsaturated hydrocarbon chain. $R_5$ may be a straight chain and/or a branched chain. The alcohol including the $R_5$ functional group is at least partially consumed in the first step and produced as a byproduct in the second step. So, in some embodiments of the present disclosure, the alcohol including the $R_5$ functional group may be recovered after completion of the second step and recycled to the first step. Examples of an alcohol suitable for the first step of Scheme 5 include primary alcohols such as methanol, ethanol, butanol, pentanol, etc. Further examples of a diol have an $R_6$ group include ethylene glycol, 1,4-benzene dimethanol, and sorbital. A polymer produced according to Scheme 5 may have between 1 and 1000 repeat units (i.e. $2 \leq n \leq 2000$). End groups can be controlled by selecting mono alcohols, such as methanol or benzyl alcohol, to terminate the reaction.

A diol used in the second step of Scheme 5 may include a linking group $R_6$. In some embodiments of the present disclosure, $R_6$ may include a saturated hydrocarbon chain and/or an unsaturated hydrocarbon chain having between 1 and 20 carbon atoms. $R_6$ may be a straight hydrocarbon chain and/or a branched hydrocarbon chain. In some embodiments of the present disclosure, at least one of $R_1$, $R_2$, $R_3$, $R_4$, $R_5$ and/or $R_6$ may include any element needed for a particular end-product and/or use. Examples include nitrogen, sulfur, phosphorus, and/or a halogen. In some embodiments of the present disclosure, the saturated ketone illustrated in Scheme 5 may be generated by the hydrogenation of an unsaturated cyclic ketone, according to Scheme 6 below, where $R_1$, $R_2$, $R_3$, and $R_4$ are functional groups as defined above for Scheme 5.

Scheme 6

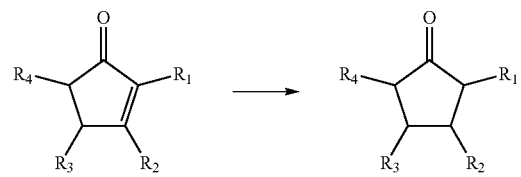

Examples of CFP-derived starting ketones suitable for creating polymers like that shown in Scheme 5, that fall within the scope of the present disclosure, are summarized in Scheme 7. Examples of suitable diols for creating polymers like that shown in Scheme 5, that fall within the scope of the present disclosure, are summarized in Scheme 8. Examples of resultant polymer structures, according to some embodiments of the present disclosure, are summarized in Scheme 9 below.

Scheme 7

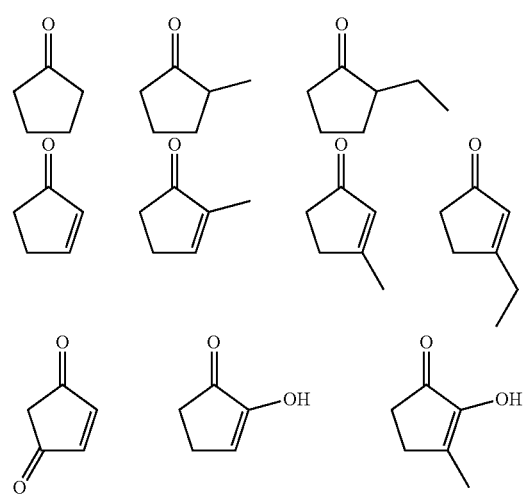

Scheme 8

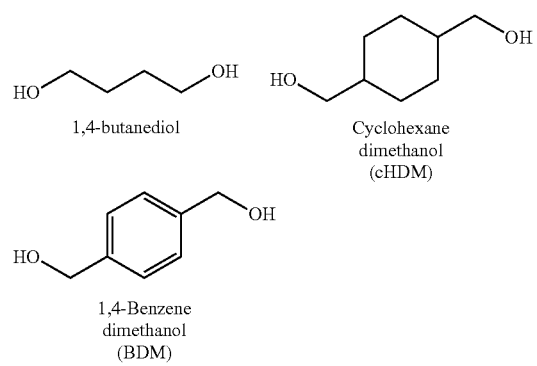

1,4-butanediol

Cyclohexane dimethanol (cHDM)

1,4-Benzene dimethanol (BDM)

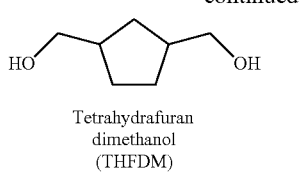

Tetrahydrafuran
dimethanol
(THFDM)

Scheme 9

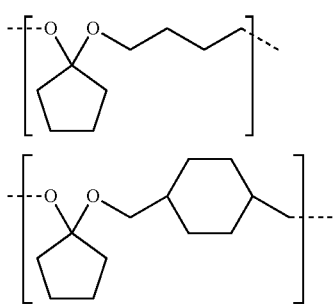

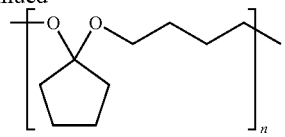

Figure 5:
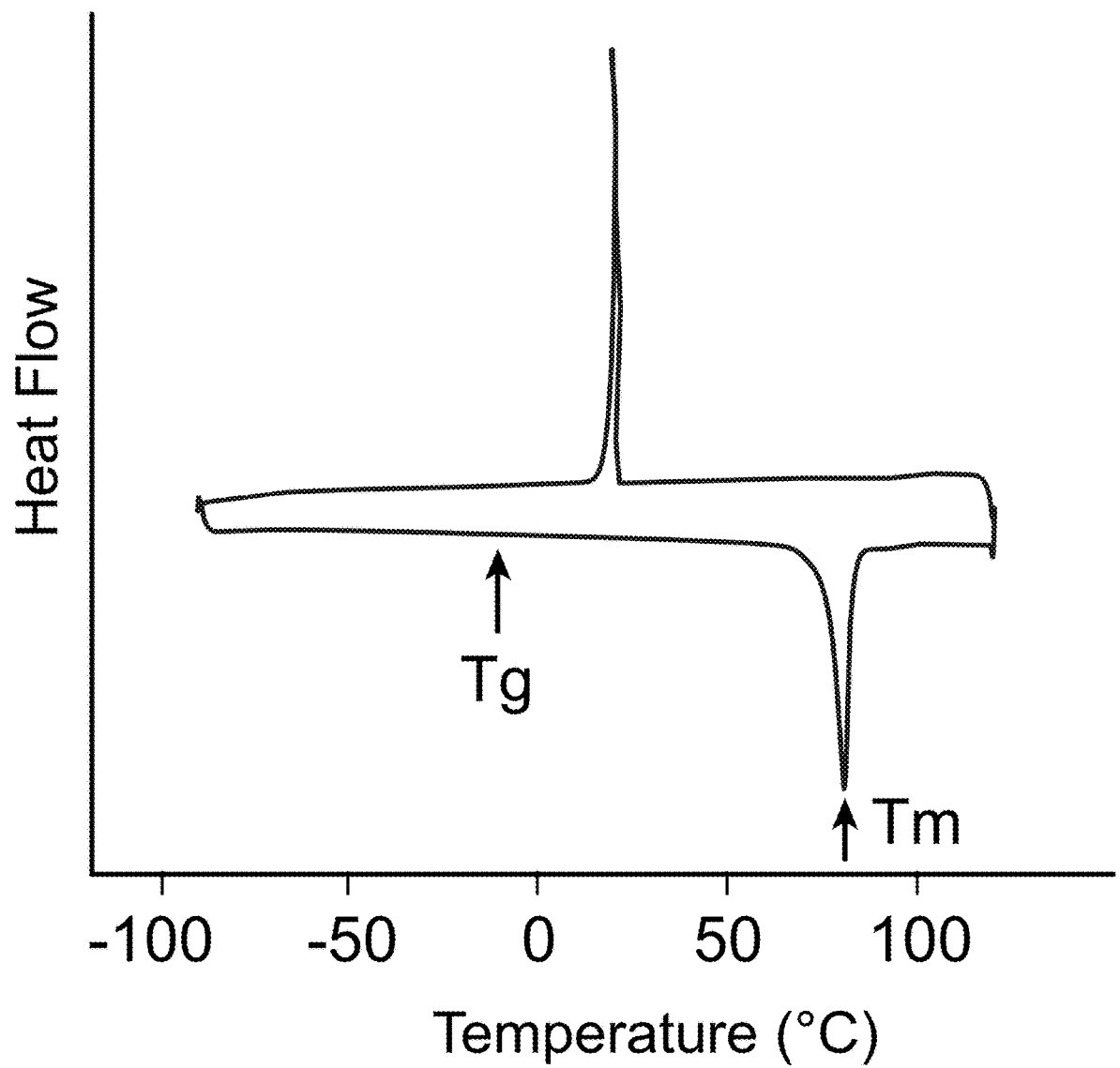
FIGS. 5 and 6 illustrate DSC traces for synthesized polyketals using two different diols (1,4-butanediol and 1,4-benzenedimethanol, respectively) demonstrating substantial shifts in thermal properties as a result, according to some embodiments of the present disclosure. Traces were taken at 10° C./min with the second scan reported.
Figure 6:
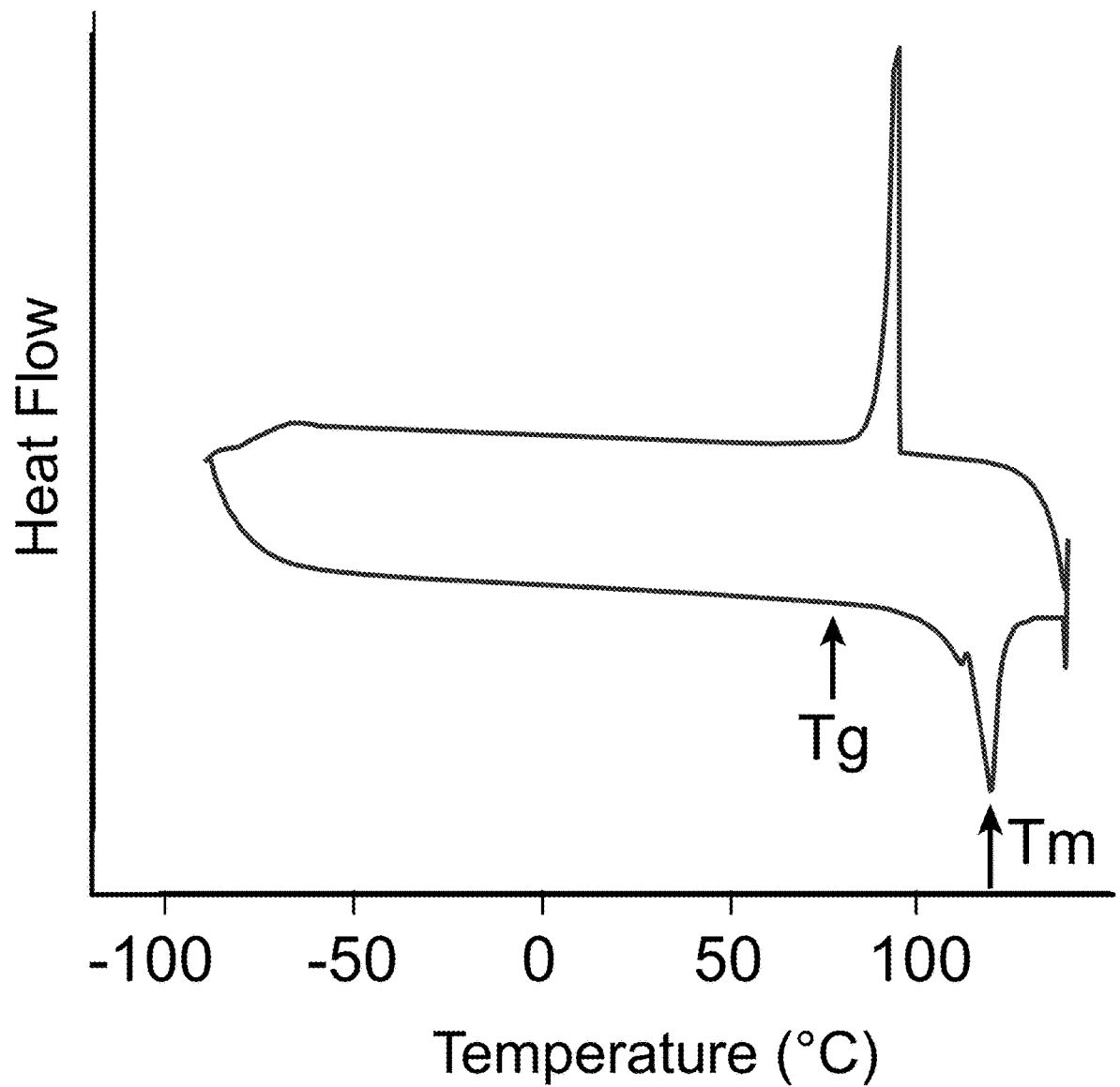

Referring to Scheme 10, prior to polymerization, the ketone group on cyclopentanone was methoxylated by refluxing 0.12 mols of the monomer in 50 mL of methanol with 0.2 M $H_2SO_4$ for 10 minutes. The product was extracted with petroleum ether three times (simulating three separation stages) and concentrated via rotary evaporation (94.2% yield). Polymerization proceeded by adding 1,1-dimethoxycyclopentane, a diol, and p-toluenesulfonic acid (1:1:0.3 molar ratio) to 10 mL of toluene and heating to 100° C. for 4 hours. The reaction was terminated by the addition of triethylamine to the solution and subsequently cooled. The product was dried and consecutively rinsed with toluene and ethyl acetate. By introducing the aromatic ring structure into the polymer back-bone the thermal properties were increased, as shown in FIGS. 5 and 6 and Table 1. FIGS. 5 and 6 illustrate DSC traces for synthesized polyketals using 1,4-butanediol and 1,4-benzenedimethanol, respectively. Glass transition temperatures and melting points are indicated in the figures.

TABLE 1

| Polymer | $T_{D, onset}$ (° C.) | $T_g$ (° C.) | $T_M$ (° C.) | $M_W$ (kDa) | $M_n$ (kDa) |
|---|---|---|---|---|---|
| p(DMC-BDO) | 253 | −32 | 82 | 6.9 | 5.4 |
| p(DMC-BDM) | 305 | 56 | 125 | — | — |

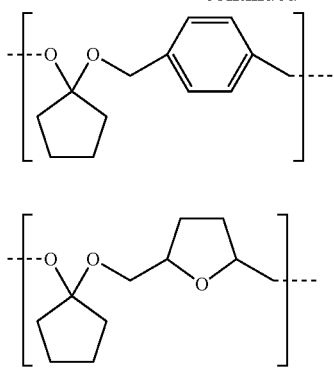

Scheme 10 provides an example of generalized Scheme 5, where 2-cyclopenten-1-ol is produced from 2-cyclopenten-1-one and subsequently polymerized to form a polyketal.

Scheme 10

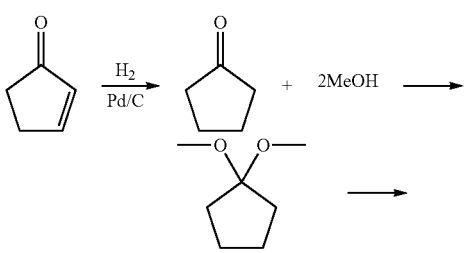

Whether or not a reactant or product described herein is "bioderived" may be determined by analytical methods. Using radiocarbon and isotope ratio mass spectrometry analysis, the bio-based content of materials can be determined. ASTM International, formally known as the American Society for Testing and Materials, has established a standard method for assessing the biobased content of carbon-containing materials. The ASTM method is designated ASTM-D6866. The application of ASTM-D6866 to derive a "biobased content" is built on the same concepts as radiocarbon dating, but without use of the age equations. The analysis is performed by deriving a ratio of the amount of radiocarbon (14 C) in an unknown sample to that of a modern reference standard. The ratio is reported as a percentage with the units "pMC" (percent modern carbon). If the material being analyzed is a mixture of present-day radiocarbon and fossil carbon (containing no radiocarbon), then the pMC value obtained correlates directly to the amount of biomass material present in the sample. Thus, ASTM-D866 may be used to validate that the compositions described herein are and/or are not derived from renewable sources.

The foregoing discussion and examples have been presented for purposes of illustration and description. The foregoing is not intended to limit the aspects, embodiments, or configurations to the form or forms disclosed herein. In the foregoing Detailed Description for example, various features of the aspects, embodiments, or configurations are grouped together in one or more embodiments, configurations, or aspects for the purpose of streamlining the disclosure. The features of the aspects, embodiments, or configurations, may be combined in alternate aspects, embodiments, or configurations other than those discussed above. This method of disclosure is not to be interpreted as reflecting an intention that the aspects, embodiments, or configurations require more features than are expressly recited in each claim. Rather, as the following claims reflect, inventive aspects lie in less than all features of a single foregoing disclosed embodiment, configuration, or aspect. While certain aspects of conventional technology have been discussed to facilitate disclosure of some embodiments of the present invention, the Applicants in no way disclaim these technical aspects, and it is contemplated that the claimed invention may encompass one or more of the conventional technical aspects discussed herein. Thus, the following claims are hereby incorporated into this Detailed Description, with each claim standing on its own as a separate aspect, embodiment, or configuration.

What is claimed is:

1. A composition comprising:
at least one of

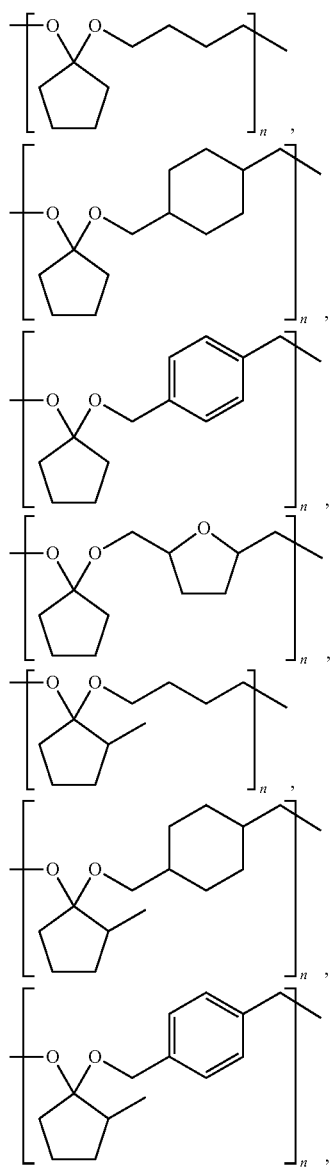

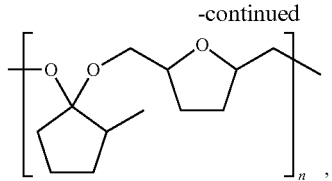

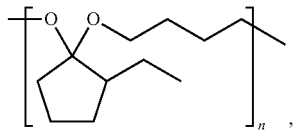

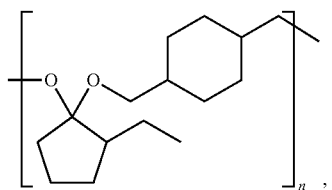

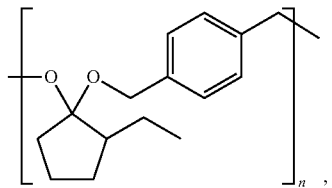

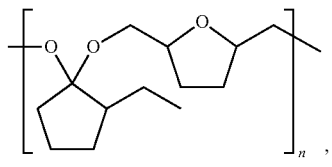

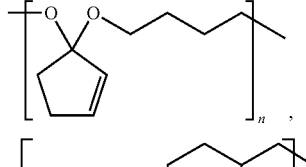

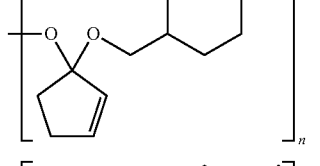

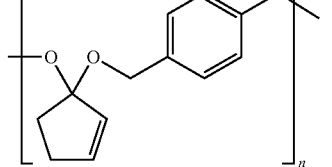

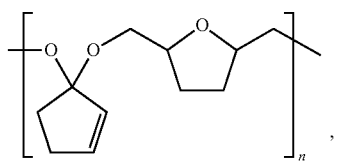

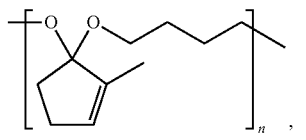

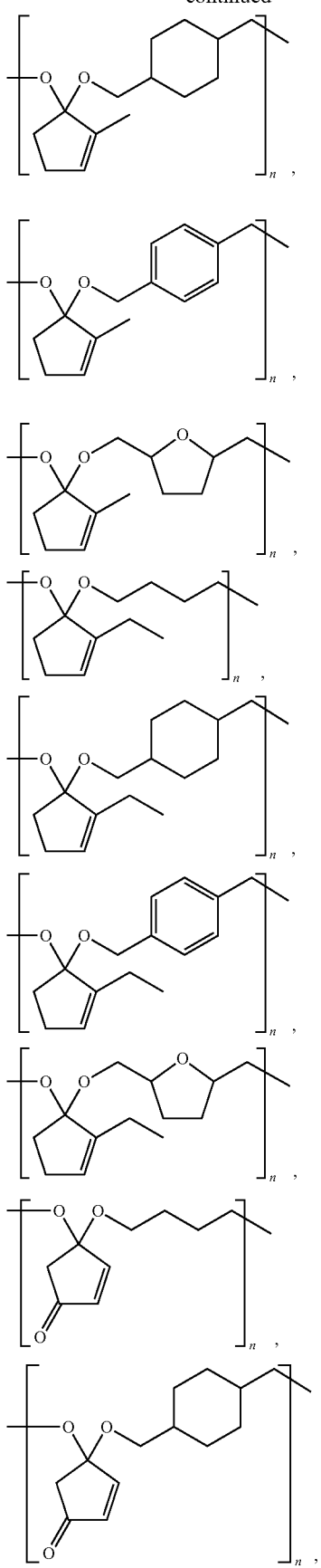
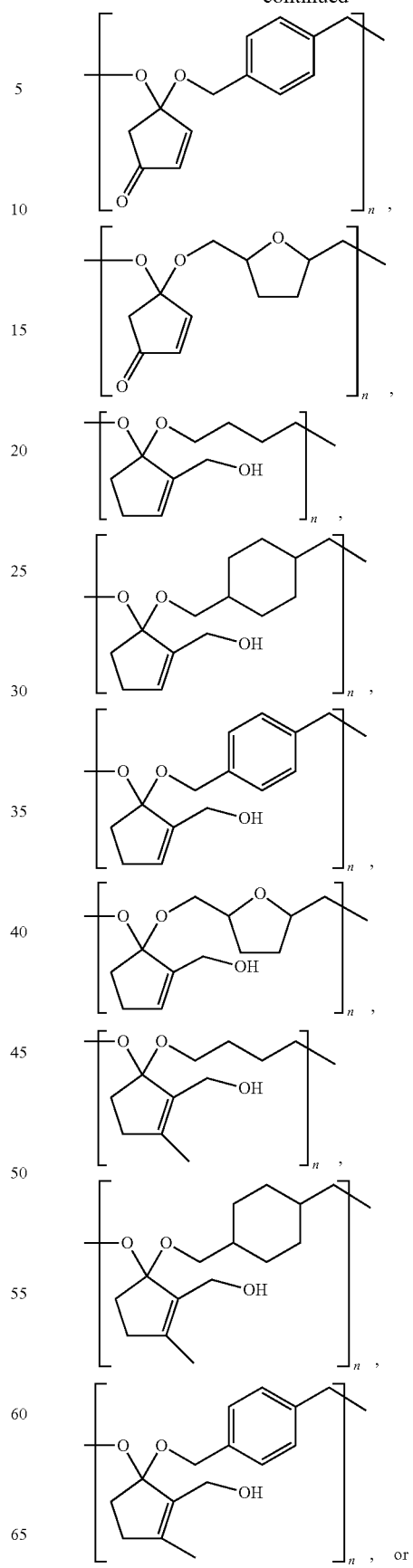

-continued
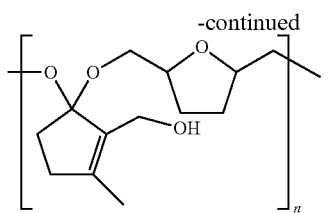
wherein 1<n≤2000.
2. The composition of claim 1, further comprising an end-group derived from an alcohol.
3. The composition of claim 1, wherein the composition is bioderived as determined by ASTM-D6866.
4. A method comprising:
a first reacting of a diether with a diol to form a polymer comprising
at least one of
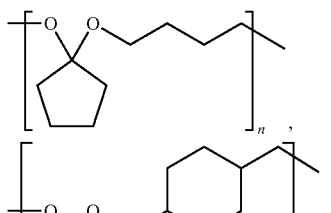
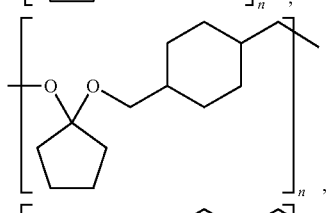
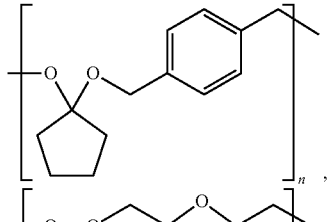
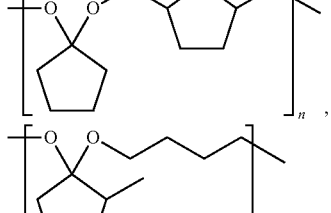
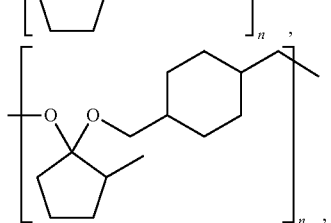
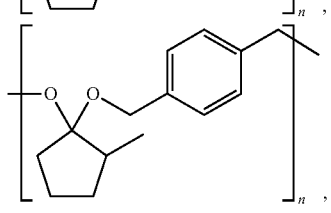
-continued
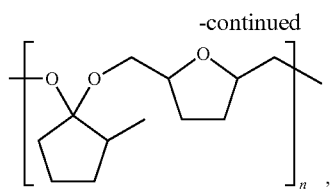
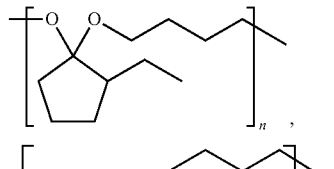
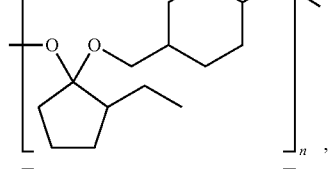
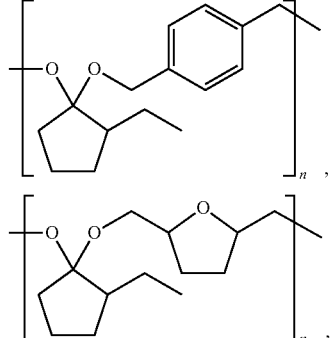
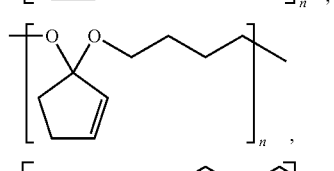
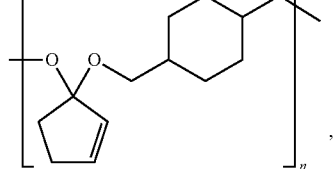
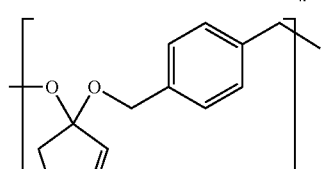
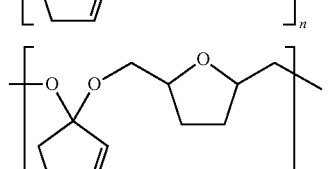
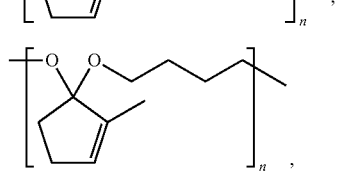

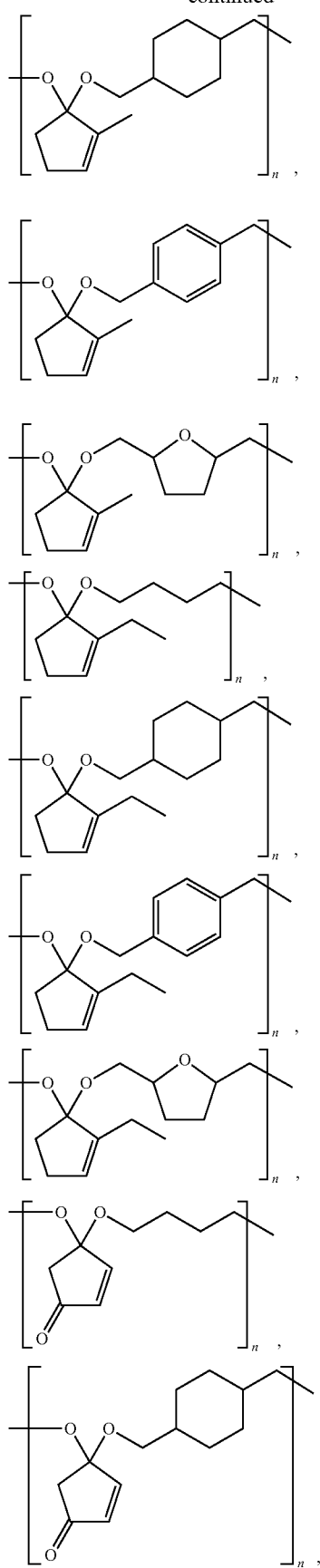

-continued

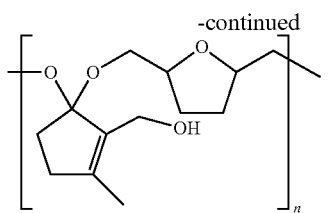

wherein 1<n≤2000.

5. The method of claim 4, further comprising:
a second reacting of a cyclic ketone with an alcohol to form the diether, wherein:
the second reacting is performed prior to the first reacting.

6. The method of claim 5, wherein the first reacting produces the alcohol.

7. The method of claim 5, further comprising:
prior to the second reacting, separating the cyclic ketone from a mixture comprising compounds derived from catalytic fast pyrolysis.

8. The method of claim 4, wherein the separating comprises at least one of distillation or liquid-liquid separation.

* * * * *